United States Patent

Yamada et al.

[11] Patent Number: 6,160,911
[45] Date of Patent: *Dec. 12, 2000

[54] METHOD AND APPARATUS FOR TRIMMING AN IMAGE AND REPRODUCING A DESIRED PART OF AN IMAGE

[75] Inventors: Tomoko Yamada; Shinji Itoh; Ryo Suzuki, all of Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,693

[22] Filed: Dec. 20, 1996

[30] Foreign Application Priority Data

Dec. 22, 1995 [JP] Japan .................................. 7-334999

[51] Int. Cl.[7] .......................................... G03F 3/10

[52] U.S. Cl. .................... 382/164; 382/164; 382/298; 358/515; 358/538

[58] Field of Search .................... 358/302, 515, 358/ 505, 527, 538, 400, 296; 382/288, 282, 164, 295, 298; 348/578–601

[56] References Cited

U.S. PATENT DOCUMENTS

| 4,346,401 | 8/1982 | Ohara ........................................ 358/75 |
| 4,384,336 | 5/1983 | Frankle et al. ......................... 382/280 |
| 4,462,043 | 7/1984 | Saitou ..................................... 358/75 |
| 4,614,967 | 9/1986 | Sayanagi ................................. 358/75 |
| 4,731,671 | 3/1988 | Alkofer .................................. 358/284 |
| 4,833,533 | 5/1989 | Augusti et al. .......................... 358/75 |
| 4,958,221 | 9/1990 | Tsuboi et al. ........................... 358/406 |
| 4,991,004 | 2/1991 | Hayashi et al. ......................... 358/451 |
| 5,138,454 | 8/1992 | Parulski ................................. 358/400 |
| 5,365,352 | 11/1994 | Tajima .................................... 358/75 |
| 5,367,387 | 11/1994 | Yamaguchi .............................. 358/75 |
| 5,495,340 | 2/1996 | Naito et al. ............................ 358/296 |

*Primary Examiner*—Matthew C. Bella
*Assistant Examiner*—Sheela Chawan

[57] ABSTRACT

A color image recorded on an original is photoelectrically read by use of an area sensor on which an image of the color image is formed through a zoom lens. A color component image signal representing information on a predetermined color component is continuously obtained from an image formed on the area sensor and reproduced as a visible image on a CRT, while two-dimensionally moving the original and zooming the zoom lens. A plurality of color image signals are obtained from an image formed on the area sensor when the original and the zoom lens are in a position where only a desired part of the color image is displayed on the CRT, and reproduced as a visible image.

14 Claims, 2 Drawing Sheets

METHOD AND APPARATUS FOR TRIMMING AN IMAGE AND REPRODUCING A DESIRED PART OF AN IMAGE

BACKGROUND OF THE INVENTION

1. Field of the Invention

This invention relates to an image reproducing method and apparatus for reproducing as a visible image image signals obtained from a color image on a reflective original such as a photograph, a print or the like or a transmission original such as a negative film, a reversal film or the like.

2. Description of the Related Art

Recently there has been developed a digital photographic printer in which image information recorded on a photographic film such as a negative film, a reversal film or the like or a print is photoelectrically read out and is converted into a digital image signal, the digital image signal is subjected to various image processings and a photosensitive material such as a photographic paper is scanned by a recording light beam modulated according to the processed image signal, thereby recording a visible image on the photosensitive material.

In the digital photographic printer, editing of an image such as synthesis of a plurality of images into an image and division of an image, layout of an print image such as editing of characters and an image, and various image processings such as adjustment of color and/or density, adjustment of scale, contour enhancement and the like can be freely carried out, and a print freely edited or processed according to its purpose can be output. Further in a conventional print by surface exposure, it is impossible to reproduce the whole image density information carried by the film or the like due to limitation in the reproducible density range of a photosensitive material. However by the digital photographic printer, it is possible to reproduce the image density information carried by the film to almost 100%.

Such a digital photographic printer basically comprises a read-out means which reads out an image recorded on an original such as a photographic film, and an image recording means which carries out an image processing on an image signal obtained in order to determine exposure conditions and the like which are used in recording a visible image, causes an exposure light beam to scan a photosensitive material according to the exposure conditions determined, develops the exposed photosensitive material and displays a visible image on a monitor.

In the read-out means, for instance, in the case of a slit scanning, a line reading light is projected onto the film while the film is fed in a direction perpendicular to the line reading light (or the reading light and the photoelectric converter element are moved), thereby two-dimensionally scanning the film. The transmission light which is transmitted through the film and carries thereon image information is focused on the light receiving face of the photoelectric converter element such as a CCD line sensor and is converted into an electric image signal. The electric image signal carrying thereon data on the amount of light is amplified and converted to a digital image signal through an A/D conversion. Then the digital image signal is subjected to various image processings such as compensation for fluctuation in properties of the CCD element, density conversion, adjustment of scale and the like and transferred to the image recording means.

In the image recording means, the image signal is reproduced as a visible image on a display such as a CRT. The operator observes the reproduced visible image and, if necessary carries out a gradation correction, a color/density correction and the like (setting of setup conditions) on the reproduced image, and transfers the corrected image signal to a printer or a monitor as a recording image signal when the reproduced image becomes satisfactory as a finished print.

In the printer, in the case of a raster scan (light beam scanning) image recording system, three color light beams, e.g., red, green and blue light beams, corresponding to photosensitive layers for the three colors formed in the photosensitive material are modulated according to the recording image signals and the modulated light beams are deflected in a main scanning direction while the photosensitive material is fed in a direction substantially normal to the main scanning direction (sub-scanning), whereby the photosensitive material is two-dimensionally scanned by the modulated light beams and an image on the film is recorded on the photosensitive material as a visible image.

After exposure to the recording light beam, the photosensitive material is subjected to a development processing according to the kind of the photosensitive material. For example, when the photosensitive material is a silver salt photosensitive material, color forming/development, bleaching/fixing, washing and drying are carried out in sequence and then finished prints are output.

Sometimes trimming is carried out on a photographic film to extract a part of the image recorded on the film. However there has not been proposed a satisfactory method of carrying out such trimming in an image reproducing apparatus where a digital image signal is obtained from a photographic film, the digital image signal is processed and an image is recorded on a photosensitive material according to the processed image signal as described above.

SUMMARY OF THE INVENTION

In view of the foregoing observations and description, the primary object of the present invention is to provide a method of and an apparatus for trimming an image and reproducing a desired part of the image in an image reproducing apparatus such as a digital photographic printer described above.

In an image reproducing method in which a color image recorded on an original is photoelectrically read out by use of an area sensor on which an image of the color image is formed through a zoom lens, thereby obtaining a color image signal representing the image on the area sensor, and the color image signal is reproduced as a visible image, a method of selectively reproducing a desired part of the color image in accordance with the present invention comprises the steps of continuously obtaining color component image signals representing information on a predetermined color component from an image formed on the area sensor and reproducing in sequence the color component image signals as visible images on a display means, while two-dimensionally moving the original and zooming the zoom lens, obtaining a color image signal from an image formed on the area sensor when the original and the zoom lens are in a position where only a desired part of the color image is displayed on the display means, and reproducing the color image signal thus obtained as a visible image.

The image reproducing apparatus in accordance with the present invention comprises an image read out device including an area sensor for photoelectrically reading out an image formed thereon, thereby obtaining a color image signal representing the image, an image forming device which forms on said area sensor an image of a color image recorded on an original, and a reproducing device which reproduces the color image signal as a visible image, and characterized in that said image forming device includes an original moving device which two-dimensionally moves said original and a zoom lens for zooming the image on the area sensor, a display device is provided to receive the color image signal from the image read out device and reproduce it as a visible image, and a control device controls said image reading device and the display means to continuously obtain color component image signals representing information on a predetermined color component from an image formed on the area sensor and reproduce in sequence the color component image signals as visible images on the display device, while two-dimensionally moving the original and zooming the image on the area sensor, and controls said reproducing device to reproduce as a visible image a color image signal obtained when the original and the zoom lens are in a position where only a desired part of the color image is displayed on the display device.

In accordance with the present invention, image signals of a predetermined color component are obtained and the image signals are reproduced as a visible image in sequence on the display device. Accordingly a video image (animation) is displayed on the display device in real time. With the video image displayed on the display means, the original is moved and the zoom lens is zoomed so that only a desired part of the image on the original comes to be displayed on the display device. That is, since the operator can determine the part of the color image to be displayed or printed observing the image displayed on the display device while moving and zooming the color image in synchronization with the image displayed on the display device, the operator can determine the trimming position precisely and efficiently.

Further since image signals carrying thereon information on only one color component are read out by the area sensor and reproduced in sequence as a visible image for determining the part of the color image to be displayed or printed, the display speed can be sufficiently high.

It is preferred that said color component image signals are compressed and/or thinned and the compressed and/or thinned color component image signals are reproduced in sequence as visible images on the display device. With this arrangement the display speed can be further increased.

In the present invention, the color image signal obtained when the original and the zoom lens are in a position where only a desired part of the color image is displayed on the display device may be reproduced as a visible image either on a display means such as a CRT or on a photosensitive material such as photographic paper. In the former case, the display device may be said display means for reproducing the color component image signals.

Further said predetermined color component need not be limited to green but may be red or blue, though green is preferred since the green component is the most sensitive in red, green and blue components of a color image.

The object of the color image on the original is sometimes inverted or directed laterally.

In such a case, it is preferred that the visible images reproduced on the display device on the basis of said color component image signals are rotated by the angle by which the object of the color image on the original is rotated so that the object can be observed erected.

DESCRIPTION OF THE PREFERRED EMBODIMENT

Figure 1:
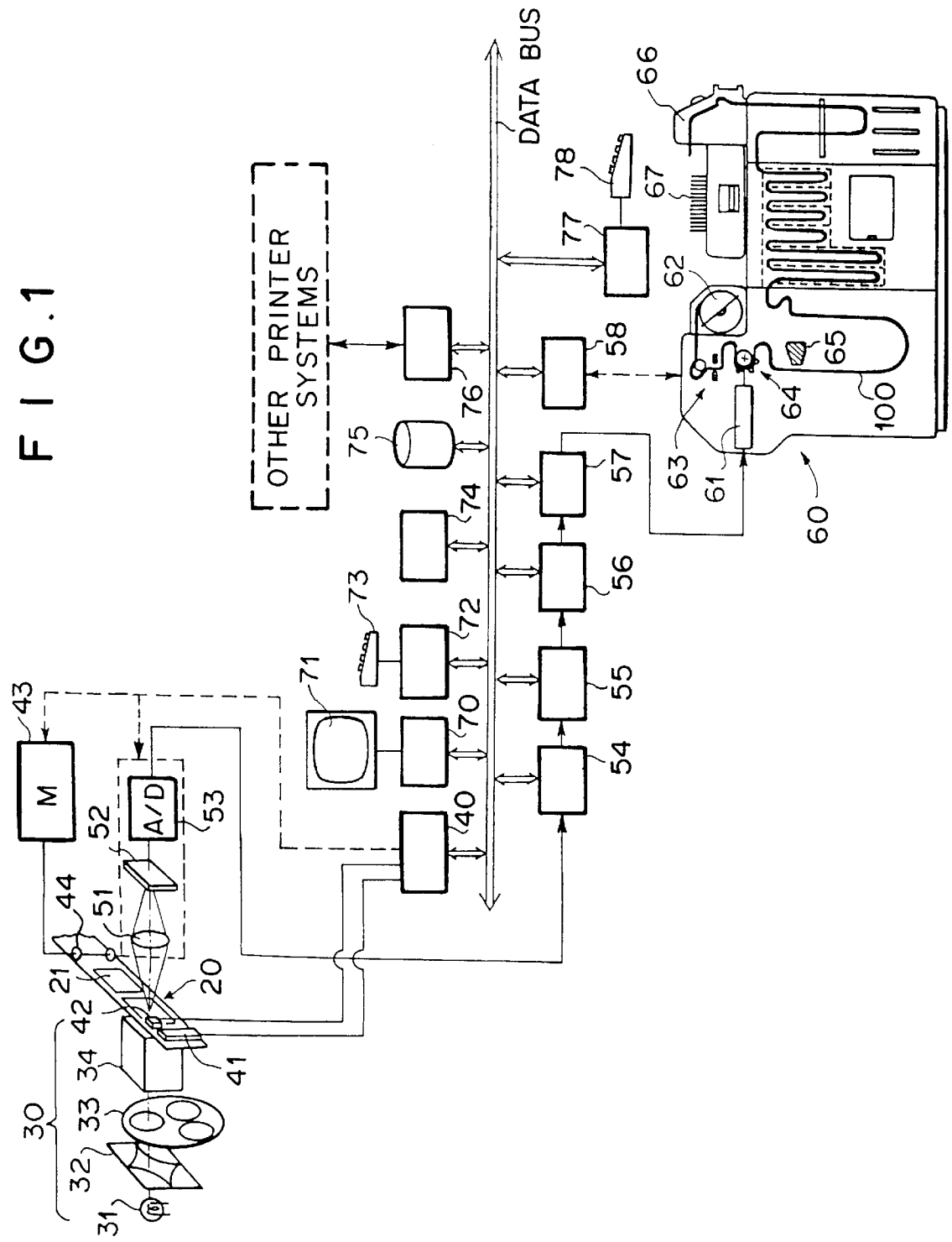
FIG. 1 is a schematic view showing an image reproducing apparatus in accordance with an embodiment of the present invention.

In FIG. 1, a digital photographic printer 100 in accordance with an embodiment of the present invention is provided with a bar code reader 42 which reads out bar codes on a photographic film 20, a frame sensor 41 which detects frames (exposures) on the film 20 on the basis of change in density, a sprocket 44 which is in mesh with perforations of the film 20 and is rotated to feed the film 20, a motor 43 which drives the sprocket 44, and a film scanner control interface 40 which sends the film number read by the bar code reader 42 and the frame numbers and regions of the frame 21 read by the frame sensor 41 to a data bus and outputs a motor control signal to the motor 43. The photographic printer 100 is further provided with a light source unit 30 which comprises a light source 31 for projecting reading light onto the frames 21 of the film 20, a light control unit 32, a color separation unit 33 and a diffusion box 34, a CCD 52 which photoelectrically reads an image (transmission image) recorded on the frame 21, onto which the reading light is projected, through an image forming optical system 51, an AF motor 50 for controlling the focal length of the image forming optical system 51, an A/D convertor 53 which converts an image signal representing the image on the frame 21 output from the CCD 52 to a digital image signal S, a first image processing system 54 which carries out necessary corrections for compensating for influence of shading, a dark current or the like on the digital image signal S output from the A/D convertor 53 and outputs a high quality image signal to a frame memory 55, a second image processing system 56 which carries out a predetermined image processing such as a gradation processing on the processed digital image signal S stored in the frame memory 55, and a modulator driver 57 which outputs a modulation signal on the basis of the digital image signal S processed with a changed parameter by the second image processing system 56. The photographic printer 100 is further provided with a printer 60 which reproduces a visible image based on the modulation signal output from the modulator driver 57, a printer interface 58, a hard disk 75 which stores the digital image signal S stored in the frame memory 55 by way of the data bus, a CRT monitor 71 which reproduces, as needed, a visible image based on the digital image signal S and displays image processing conditions and the like, a display interface 70, a keyboard 73 for inputting image processing conditions, correction values for the image processing conditions, an image retrieval information and the like, a keyboard interface 72, a CPU (central processing unit) 74, a communication port 76 which is connected to other digital photographic printer systems through a communication line, a keyboard 78 which is disposed in a check section for checking photographic prints reproduced by the printer 60 and is for inputting, as needed, a reprint instruction and a keyboard interface 77. The CPU 74 carries out mapping of the image retrieval information including the frame numbers read by the bar code reader 21, the image processing conditions input from the first and second image processing systems 54 and 56 and the digital image signal S input from the frame memory 55 and then stores them in the hard disk 75 by way of the data bus. Further the CPU 74 retrieves from the data bus a digital image signal S corresponding to image retrieval information input from the keyboard 73 and controls it, and controls the instruments connected to the data bus.

The hard disk 75 has a storage capacity not smaller than 25 GB. Generally an image signal required for obtaining a resolution equivalent to a photographic print of L size (about 9 cm×13 cm) is about 5 MB/frame. When the image signal is compressed to such an extent that does not deteriorate the image quality, it becomes 1 MB/frame. In an average mini-laboratory, working days may be set 25 days/month, the number of films brought in the laboratory may be set 50/day and the number of exposures per film may be set 20. Accordingly, when it is assumed that image signals are deleted in sequence when one month lapses since the film is brought in, the hard disk 75 should have a storage capacity of 25 GB.

The printer 60 comprises a printing section, a developing section and a drying section. The printing section comprises a magazine 62 which stores a roll of photographic paper 100 in a continuous length, a hole punch unit 63 which punches out reference holes in the photographic paper 100 for positioning the photographic paper 100, a sub-scanning drive system 64 which feeds the photographic paper 100 in the longitudinal direction thereof (sub-scanning) on the basis of the reference holes, an exposing light scanner 61 which modulates exposing light according to the modulation signal output from the modulator driver 57 and causing the modulated exposing light to scan the photographic paper 100 in a main scanning direction and a back printing unit 65 which records the image retrieval information input through the printer control interface 58 on the back side of the photographic paper 100.

The drying section comprises a cutter 66 which cuts the exposed photographic paper 100 exposure by exposure after drying and a sorter 67 which arranges in order the prints thus cut from the exposed photographic paper 100 in a continuous length.

Figure 2:
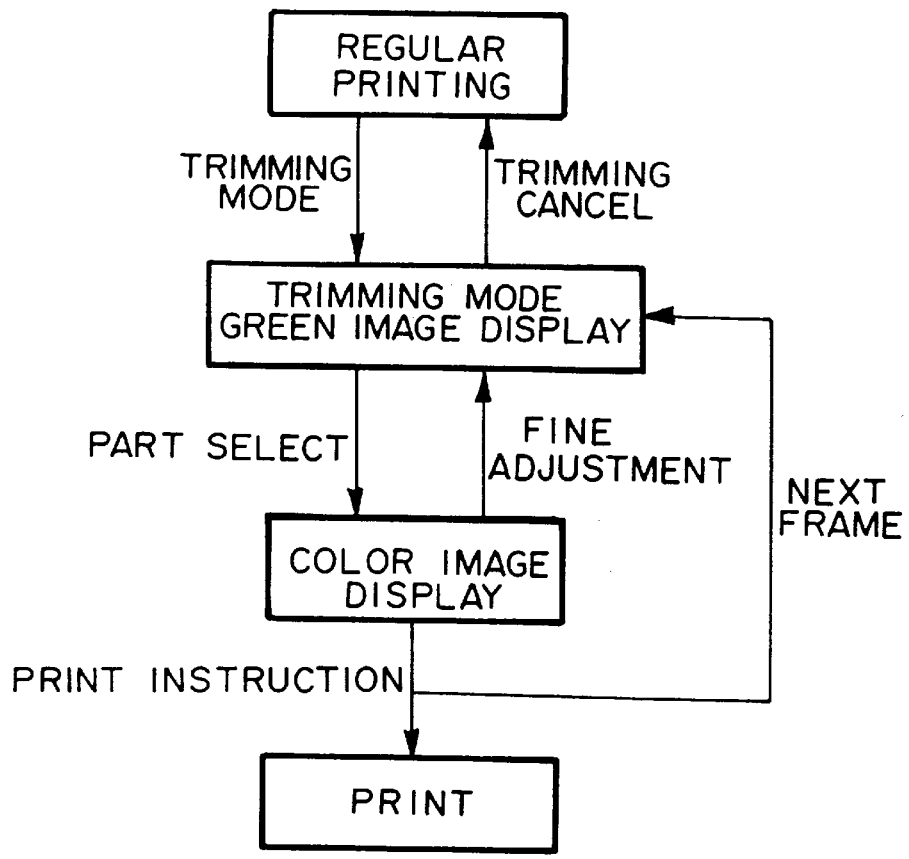
FIG. 2 is a flow chart for illustrating a trimming mode.
Figure 3:
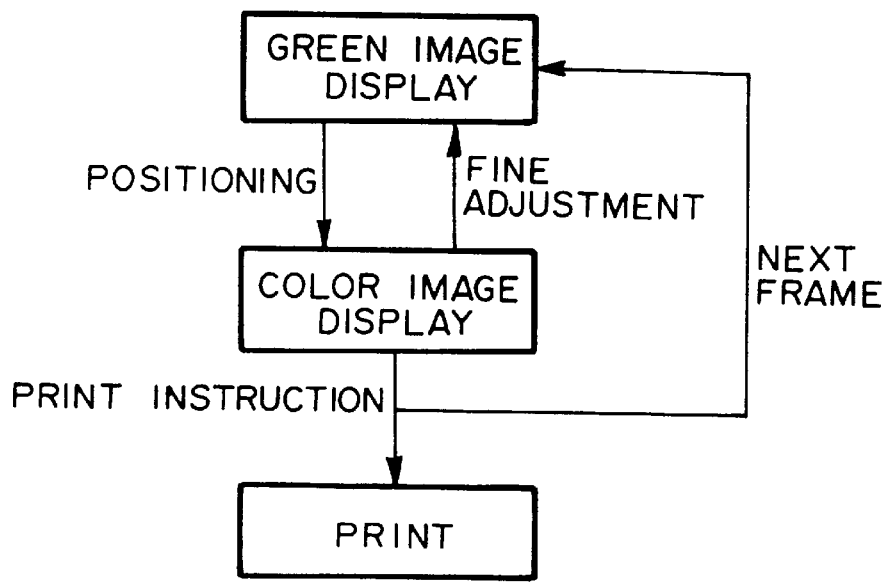
FIG. 3 is a flow chart for illustrating a regular printing mode.

Operation of the digital photographic printer 100 will be described, hereinbelow. FIGS. 2 and 3 are flow charts for illustrating processing carried out in the photographic printer 100 shown in FIG. 1. The trimming mode shown in FIG. 2 will be described first. When an image to be trimmed is to be read out while the photographic printer 100 is operating in the regular printing mode to be described later with reference to FIG. 3, instruction that the trimming mode is to be selected is input through the keyboard 73. Then the following processing is carried out.

The motor 43 is first driven by way of the film scanner control interface 40, and the film piece 20 (negative film) carrying thereon a plurality of exposures (frames) is fed by the sprocket 44 when the left side end of the film piece 20 is brought into engagement with the sprocket 44. The sprocket 44 is arranged to be able to two-dimensionally move the film piece 20 after the film piece 20 is stopped While the sprocket 44 is feeding the film piece 20, the frame sensor 41 reads the density of the film piece 20 to seek for the region where an exposure (frame) 21 exists and the film scanner control interface 40 controls the motor 43 by way of the CPU 74 on the basis of the density information read by the frame sensor 41 to stop the first exposure 21 in a predetermined read-out position.

When the frame sensor 41 detects the first exposure 21 and the first exposure 21 is stopped in the predetermined read-out position, light emitted from the light source unit 30 is projected onto the exposure 21 and a transmission image of the exposure 21 enters the image forming optical system 51, whereby a predetermined image is formed on the image receiving face of the CCD 52. In the trimming mode, the color separation unit 33 is set to green.

The CCD 52 reads the image formed on the image receiving face and photoelectrically converts it into a green component image signal SG representing information on the green component. The green component image signal SG is digitized by the A/D convertor 53, whereby a digital green component image signal SG' made up of digital green component image signal components for the respective picture elements is obtained. The digital green component image signal SG' is input into the first image processing system 54 and is removed with influence of shading and/or dark current. The digital green component image signal SG' processed by the first image processing system 54 is once stored in the frame memory 55.

The image signal SG' once stored in the frame memory 55 is input into the second image processing system 56. Since an image reproduced on the basis of the image signal SG' is used only for determining a part to be trimmed or part to be reproduced, the quality of the reproduced image is not so important. Accordingly, in the second image processing system 56, a compressing and thinning processing is carried out on the image signal SG'. For example, when the CCD 52 has picture elements of 1320×920, the image signal components of the image signal SG' are thinned to 345×230 in the second image processing system 56. Then a visible image is displayed on the CRT 71 on the basis of the thus processed image signal SG'. Though the visible image displayed on the CRT 71 is inferior to the original image in quality, the display speed is higher.

Such a processing for displaying a green image is carried out at a rate of 15 frames/sec, whereby the image on the film piece 20 is reproduced on the CRT 71 as a video image (animation).

While observing the video image on the CRT 71, the operator inputs through the keyboard 73 instruction that the film piece 20 is to be two-dimensionally moved and the image on the CRT 71 is to be zoomed. Then the sprocket 44 is two-dimensionally moved to two-dimensionally move the image displayed on the CRT 71 and at the same time, the lens 51 is moved in the direction of the optical axis to zoom the image on the CRT 71. At this time, since an animation of the image recorded on the film piece 20 is displayed on the CRT 71, movement and zooming of the image are carried out in real time. When a desired part of the image comes to be displayed on the CRT 71, the operator stops the sprocket 44 and the lens 51. Further, the angle of rotation by which the object in the image displayed on the CRT 71 is rotated from the erected position, that is, whether the object is inverted, whether the object is directed sideways or whether the object is erected, is checked, and when the object is inverted or directed sideways, instruction that the image displayed on the CRT 71 is to be rotated by 90° or 180° is input through the keyboard 73.

In this manner, the operator selects the part of the image to be printed or displayed. At the time the sprocket 44 and the lens 51 are stopped, only the desired part of the image is in the field of view of the lens 51 and only the image of the desired part is formed on the CCD 52. In this state, red, green and blue lights are projected onto the exposure 21 in sequence and a color image signal S made up of red, green and blue image signals representing the desired part of the image on the film piece 20 is obtained. The color image signal S is digitized by the A/D convertor 53, whereby a digital color image signal S' is obtained. The digital color image signal S' is input into the first image processing system 54 and is removed with influence of shading and/or dark current. The digital color image signal S' processed by the first image processing system 54 is once stored in the frame memory 55.

The digital color image signal S' once stored in the frame memory 55 is input into the second image processing system 56. In the second image processing system 56, a predetermined image processing such as a gradation processing is carried out on the image signal S' and a visible color image is reproduced on the CRT 71 on the basis of the processed color image signal S'.

The processed color image signal S' is input into the printing section of the printer 60, and a visible color image is printed on a photographic paper or the like.

After an image is printed in this manner, the operator inputs through the keyboard 73 instruction on whether the next original is to be printed in the trimming mode or in the regular printing mode.

In the regular printing mode, a still green image is displayed on the CRT 71 and the operator determines whether the image on the film piece 20 is to be printed on a photographic paper 100 observing the still green image on the CRT 71. When it is determined through observation of the still green image on the CRT 71 that the image on the film piece 20 is not worth printing, the operator can immediately shift to the next frame, whereby processing time can be shortened. When it is determined that the image on the film piece 20 is worth printing, a color image signal is obtained from the film piece 20 in the manner described above and a visible color image is displayed on the CRT 71 and printed on a photographic paper or the like on the basis of the color image signal.

Though, in the embodiment described above, trimming is carried out by use of a green component image signal, for instance, a red or blue component image signal or an image signal carrying thereon only information on the density of picture elements may be employed in trimming.

As can be understood from the description above, in the embodiment described above, image information only on a predetermined color component is continuously read out from a color image by the CCD 52, image signals SG of the predetermined color component are obtained and the image signals SG are reproduced as a visible image in sequence on the CRT 71. Accordingly a video image (animation) is displayed on the CRT 71 in real time. With the video image displayed on the CRT 71, the film piece 20 is moved and the lens 51 is zoomed so that only a desired part of the image on the film piece 20 comes to be displayed on the CRT 71. That is, since the operator can determine the part of the color image to be displayed or printed observing the image displayed on the CRT 71 while moving and zooming the color image in synchronization with the image displayed on the CRT 71, the operator can determine the trimming position precisely and efficiently.

Further since an image signal carrying thereon information on only one color component is read out by the area sensor and an image is displayed on the CRT 71 on the basis of an image obtained by compressing and thinning the image signal as detected by the area sensor, the display speed can be sufficiently increased.

Further since the image signal which is finally output to the CRT 71 or the printing section of the printer for display or printing of the desired part of the image is obtained from the part of the film piece 20 which corresponds to the image displayed on the CRT 71, the image can be trimmed more precisely than conventional methods of trimming where trimming is effected directly on the film piece 20.

Since the green component is the most sensitive in red, green and blue components of a color image, a more clear video image can be displayed on the CRT 71 when the green component image signal is employed as the image signal for displaying the video image for determining the trimming position.

What is claimed is:

1. In an image reproducing method in which a multicolored image recorded on an original is photoelectrically read by use of an area sensor on which an image of the multicolored image is formed through a zoom lens, thereby obtaining a plurality of monochromatic color image signals representing the image on the area sensor, and the plurality of monochromatic color image signals are reproduced as a visible image, a method of selectively reproducing a desired part of the multicolored image comprising the steps of:

continuously obtaining only a green color component image signal representing information of a green color component from the multicolored image formed on the area sensor, said green color component image signal representative of said multicolored image;

reproducing the multicolored image formed on the area sensor as a visible image of said green color component image signal on a display;

two-dimensionally moving the original simultaneously with zooming the multicolored image on the area sensor with the zoom lens, said original moved and image zoomed in real time and in synchronization with said displayed visible image;

obtaining a plurality of monochromatic color image signals from the multicolored image formed on the area sensor when the original and the zoom lens are in a position where only a desired part of the visible green image corresponding to a desired part of said multicolored image is displayed; and reproducing the plurality of monochromatic color image signals as a multicolored visible image based on the displayed desired part.

2. A method as defined in claim 1 in which said green color component image signal is compressed and/or thinned and reproduced as a visible image on the display.

3. A method as defined in claim 1 or 2 in which the visible image reproduced on the display is rotated by the angle by which the object of the multicolored image on the original is rotated so that the object can be observed erected.

4. An image reproducing apparatus comprising:

an image reading device including an area sensor for photoelectrically reading an image formed thereon, thereby obtaining a plurality of monochromatic image signals representing the image;

an image forming device which forms on said area sensor an image of a multicolored image recorded on an original, said image forming device including an original moving device which two-dimensionally moves said original and a zoom lens for zooming the multicolored image on the area sensor;

a control device for controlling said image reading device to continuously obtain only a green color component image signal representing information of a green color component from the multicolored image formed on the area sensor, and for reproducing the multicolored image formed on the area sensor as a visible image of said representative green color component image signal on a display, while simultaneously two-dimensionally moving the original and zooming the image on the area sensor in real time and in synchronization with said displayed visible image; and a reproducing device for reproducing the plurality of monochromatic color image signals as a multicolored visible image when the original and the zoom lens are in a position where only a desired part of the visible green image is displayed.

5. An image reproducing apparatus as defined in claim 4 in which said display compresses and/or thins said green color component image signal and reproduces the compressed and/or thinned green color component image signal as a visible image.

6. An image reproducing apparatus as defined in claim 4 or 5 in which the visible image reproduced on the display is rotated by the angle by which the object of the multicolored image on the original is rotated so that the object can be observed erected.

7. A method of reproducing a desired multicolored image recorded on an original comprising the steps of:

separating only a green color component from said recorded multicolored image to obtain a green color component image signal representative of said recorded multicolored image;

reproducing said recorded multicolored image as a video image of said representative green color component image signal on a display;

determining whether a desired part of said recorded multicolored image is to be reproduced based on inspection of said displayed video image;

obtaining a plurality of monochromatic color image signals representing said recorded multicolored image when said desired part of said green video image representing said recorded multicolored image is displayed; and reproducing said recorded multicolored image from said plurality of monochromatic color image signals.

8. A method as defined in claim 7, further comprising the steps of:

compressing and/or thinning said green color component image signal; and compressing and/or thinning said plurality of monochromatic color image signals.

9. A method of reproducing a desired part of a multicolored image recorded on an original comprising the steps of:

separating only a green color component from said recorded multicolored image to obtain a green color component image signal representative of said recorded multicolored image;

reproducing said recorded multicolored image as a video image of said representative green color component image signal on a display;

adjusting the original so that only a desired part of said green video image corresponding to a desired part of said recorded multicolored image is displayed;

obtaining a plurality of monochromatic color image signals representing the desired part of said recorded multicolored image; and reproducing the desired part of said recorded multicolored image from said plurality of monochromatic color image signals.

10. A method as defined in claim 9, further comprising the steps of:

compressing and/or thinning said green color component image signal; and compressing and/or thinning said plurality of monochromatic color image signals.

11. An image reproducing apparatus comprising:

an image reading device for separating only a green color component from a recorded multicolored image to obtain a green color component image signal representative of said recorded multicolored image;

an image displaying device for reproducing said multicolored recorded image as a video image of said representative green color component image signal; and a control device for obtaining a plurality of monochromatic color image signals representing said recorded multicolored image when a desired part of said video image representing a desired part of said recorded multicolored image is displayed, and for reproducing said recorded multicolored image from said plurality of monochromatic color image signals based on said displayed desired part.

12. An image reproducing apparatus as defined in claim 11, further comprising a device for compressing and/or thinning said green color component image signal and/or said plurality of monochromatic color image signals.

13. An image reproducing apparatus comprising:

an image reading device for separating only a green color component from a multicolored image recorded on an original to obtain a green color component image signal representative of said recorded multicolored image;

an image displaying device for displaying said recorded multicolored image as a video image of said representative green color component image signal; and a control device for adjusting said original so that only a desired part of said video image corresponding to a desired part of said recorded multicolored image is displayed, obtaining a plurality of monochromatic color image signals representing the desired part of said recorded multicolored image, and reproducing the desired part of said recorded multicolored image from said plurality of monochromatic color image signals.

14. An image reproducing apparatus as defined in claim 13, further comprising a device for compressing and/or thinning said green color component image signal and/or said plurality of monochromatic color image signals.

* * * * *